United States Patent Office 2,768,182
Patented Oct. 23, 1956

2,768,182
VINYL-EPOXYETHYL-BENZENE

Robert Emmett Burk, West Chester, Pa., and George Esler Inskeep, Wilmington, Del., assignors to E. I. du Pont de Nemours and Company, Wilmington, Del., a corporation of Delaware No Drawing. Application January 28, 1955,
Serial No. 484,817

1 Claim. (Cl. 260—348)

This invention relates to a new composition of matter and more particularly to divinyl monoepoxides of benzene.

The new compounds of the invention may be represented by the structural formula:

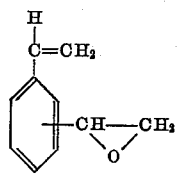

The compounds of this invention are clear, distillable liquids soluble in most common organic solvents. The divinyl benzene monoepoxides boil in the range of 60° C. to 65° C. at a pressure of 1 mm. mercury. Divinyl benzene monoepoxides are prepared by reacting divinyl benzene (which may be ortho, meta, para or any mixture thereof) with a peracid such as peracetic acid in amounts sufficient to cause the formation of only one epoxide group leaving the other vinyl group unchanged. The resulting ortho, meta or para divinyl benzene monoepoxides are obtained as distillable liquids. Since separation of the isomers is extremely difficult and all three forms are equally useful, the isomers are treated hereinafter as one compound. Divinyl benzene monoepoxide is a valuable intermediate in the production of polymers from divinyl benzene monepoxide. The polymers can be obtained by free radical polymerization of the vinyl groups and can be transformed into a thermosetting resin by crosslinking the epoxide groups with the acid of acidic or basic catalysts or crosslinking agent as described and claimed in copending application Serial No. 484,818, filed January 28, 1955. Polymers obtained from divinyl benzene monoepoxide are valuable resins useful in low pressure lamination of materials such as glass fibers.

The following example, in which parts are by weight unless otherwise noted, illustrates the preparation of this novel compound in more detail.

Example

A reaction vessel was charged with 790 parts of commercial divinyl benzene, 1750 parts of benzene and 1160 parts of sodium bicarbonate. The mixture was stirred vigorously and cooled externally until the internal temperature dropped to 10° C. To the stirred mixture, maintained at 10 to 15° C., was then added gradually 815 parts of a 40% peracetic acid solution in acetic acid (1.25 moles of peracetic acid to one mol of divinyl benzene) over a period of two hours, after which the reaction mixture was stirred with cooling for an additional 5 hours. To the reaction mixture was then added 2000 parts of water. The benzene layer was separated from the water and passed through a 300 mesh screen to remove all solid particles and then washed with 500 parts of a 5% solution of sodium hydroxide in water. The benzene solution of the product was inhibited by the addition of 4 parts of trinitrobenzene, dried over anhydrous sodium sulfate, and refrigerated until distillation could be carried out. The divinyl benzene monoepoxide was obtained on fractional distillation after the benzene solvent had been removed by flash distillation at aspirator pressure (15–25 mm. Hg) with a maximum bath temperature of 45° C. until condensation stopped. The various fractions obtained as distillates included 102.8 parts of vinyl benzene monoepoxide (B. P. 65° C. at 1 mm.). This corresponds to 16.4% yield based on peracetic acid.

*Analysis.*—Calculated for $C_{10}H_{10}O$: C, 82.3; H, 6.8; O, 10.9. Found: C, 82.3; H, 7.3; O, 9.7 (oxygen determination by epoxide oxygen determination method).

Due to the fact that isomers and impurities are involved in the formation of the product refractive index measurements were not used for identification of the product. In addition to analysis other indications that the compound has a divinyl monoepoxide structure are furnished by the method of preparation and by infra red spectra, which show absorptions at three wave lengths characteristic of a terminal unsaturated group. Moreover, the ready polymerization of vinyl benzene monoepoxide as described in copending application Serial No. 484,418, filed January 28, 1955, by free radical mechanism also confirms the presence of a vinyl group.

The divinyl benzene used in the above example was a commercial concentrate having approximately the following analysis:

| | |
|---|---|
| Divinyl benzene (major portion meta) | 54.7 |
| Ethyl vinyl benzene | 33.5 |
| Saturates | 10.1 |
| Aldehydes | 0.122 |
| Peroxides | 0.0075 |
| Naphthalene | 0.52 |

It is believed that the impurities of the starting material are partially responsible for the low yields obtained by this method of preparing divinyl benzene monoepoxide.

In the preparation of the divinyl benzene monoepoxide other percarboxylic acids can be used beside the one shown in the example such as perbenzoic, monoperphthalic, performic and perpropionic although peracetic acid is the most readily available. The relative proportion of peracid and divinyl benzene are not critical but the best yields are obtained when there is used between 0.75 and 1.25 mol of peracidic acid per mol of divinyl benzene. When a higher proportion of peracid is used varying amounts of diepoxide are formed. Since the percarboxylic acids are preferably stored and handled in solution, it is preferable to carry out the reaction in a solvent which is conveniently but not necessarily the same as that in which the peracid is dissolved. Any inert organic solvent, free of aliphatic unsaturation, may be used, e. g. tetrachloroethane, toluene, benzene and the like. The reaction temperature is preferably kept below about 15 to 20° C. since the reaction is exothermic. Moreover, a relatively low temperature during the epoxidation reaction is desirable to avoid reaction of the epoxide with the organic acid generated, since this side reaction produces esters and decreases the yield. The product is conveniently isolated by fractional distillation. However, the reactivity of the divinyl benzene monoepoxide is such that the monomer should be stabilized to avoid premature polymerization, as shown in the example.

Divinyl benzene monoepoxide in addition to its usefulness as a starting material for the preparation of technically valuable polymers has many other uses deriving from the fact that it possessses two reactive functions. For example, it reacts through the epoxy group with various compounds, e. g. with mono- or dicarboxylic acids or anhydrides to give esters, with alcohols to gives ethers and with various other active compounds such as amines and thiols.

We claim:

Divinyl-benzene monoepoxide.

References Cited in the file of this patent

UNITED STATES PATENTS 2,687,406     Foster _____ Aug. 24, 1954

OTHER REFERENCES

Everett et al., J. Chem. Soc. 1950: 3133.